(12) United States Patent
Lee

(10) Patent No.: US 11,099,255 B2
(45) Date of Patent: Aug. 24, 2021

(54) RADAR AND ANTENNA BUILT IN RADAR

(71) Applicant: BITSENSING INC., Seoul (KR)

(72) Inventor: Jae Eun Lee, Seoul (KR)

(73) Assignee: BITSENSING INC., Seoul (KR)

( * ) Notice: Subject to any disclaimer, the term of this patent is extended or adjusted under 35 U.S.C. 154(b) by 0 days.

(21) Appl. No.: 16/829,638

(22) Filed: Mar. 25, 2020

(65) Prior Publication Data

US 2020/0379083 A1    Dec. 3, 2020

Related U.S. Application Data

(63) Continuation of application No. PCT/KR2019/014167, filed on Oct. 25, 2019.

(30) Foreign Application Priority Data

Oct. 25, 2018 (KR) .................... 10-2018-0128412
Oct. 24, 2019 (KR) .................... 10-2019-0133244

(51) Int. Cl.
*G01S 7/03* (2006.01)
*H01Q 21/06* (2006.01)
*G01S 13/68* (2006.01)

(52) U.S. Cl.
CPC .............. *G01S 7/032* (2013.01); *G01S 13/68* (2013.01); *H01Q 21/06* (2013.01)

(58) Field of Classification Search
CPC .......... G01S 7/032; G01S 13/68; H01Q 21/06
USPC ....................................................... 342/157
See application file for complete search history.

(56) References Cited

U.S. PATENT DOCUMENTS

| | | | |
|---|---|---|---|
| 8,009,082 B2* | 8/2011 | Shinoda | G01S 13/4463 342/70 |
| 9,869,762 B1* | 1/2018 | Alland | H01Q 21/28 |
| 10,230,176 B2* | 3/2019 | Natsume | G01S 13/584 |
| 10,746,849 B2* | 8/2020 | Turbiner | G01S 13/931 |
| 10,771,124 B2* | 9/2020 | Fang | H04B 7/046 |
| 10,866,306 B2* | 12/2020 | Maher | G01S 13/06 |

(Continued)

FOREIGN PATENT DOCUMENTS

| | | | |
|---|---|---|---|
| KR | 101527771 B1 * | 6/2015 | |
| KR | 101527771 B1 | 6/2015 | |

(Continued)

OTHER PUBLICATIONS

International Search Report of PCT/KR2019/014167 dated Feb. 5, 2020.

*Primary Examiner* — Vladimir Magloire
*Assistant Examiner* — Alexander L. Syrkin
(74) *Attorney, Agent, or Firm* — Dinsmore & Shohl LLP; Yongsok Choi, Esq.

(57) ABSTRACT

A radar includes a transmitter antenna unit that includes multiple transmitter antennas arranged at first horizontal distances and first vertical distances from each other, a receiver antenna unit that includes multiple receiver antennas arranged at second horizontal distances and second vertical distances from each other, a transceiver that transmits transmission signals through the transmitter antenna unit and receives return signals reflected from a target object trough the receiver antenna unit, and a processing unit that derives information about the target object by processing the received return signals.

12 Claims, 9 Drawing Sheets

(56) References Cited

U.S. PATENT DOCUMENTS

| | | | | |
|---|---|---|---|---|
| 2002/0109630 A1* | 8/2002 | Law | ..................... | H01Q 21/065 |
| | | | | 342/368 |
| 2015/0229032 A1* | 8/2015 | Liu | ......................... | H01Q 3/20 |
| | | | | 343/766 |
| 2017/0276770 A1* | 9/2017 | Lin | ...................... | G01S 13/931 |
| 2019/0285738 A1* | 9/2019 | Iwasa | ..................... | G01S 7/032 |
| 2019/0293753 A1* | 9/2019 | Iwasa | ........................ | G01S 7/03 |

FOREIGN PATENT DOCUMENTS

| KR | 20170082838 A | * | 7/2017 |
|---|---|---|---|
| KR | 1020170082838 A | | 7/2017 |
| KR | 20190058072 A | * | 5/2019 |
| KR | 1020190058072 A | | 5/2019 |

* cited by examiner

RADAR AND ANTENNA BUILT IN RADAR

CROSS-REFERENCE TO RELATED APPLICATIONS

This application is a continuation of International Application No. PCT/KR2019/014167 filed on Oct. 25, 2019, which claims priority to Korean Patent Application No. 10-2018-0128412 filed on Oct. 25, 2018 and Korean Patent Application No. 10-2019-0133244 filed on Oct. 24, 2019, the entire contents of which are herein incorporated by reference.

TECHNICAL FIELD

The present disclosure relates to a radar and an antenna built in the radar.

BACKGROUND

In general, a radar needs to have high angular resolution to detect or track the distance, speed, and angle of a target device by transmitting and receiving electronic waves.

Conventional radars have a structure in which multiple receiver antennas are arrayed to increase angular resolution. However, a radar having this array needs large-size antennas and a lot of components connected to a transceiver. Therefore, the overall size of the radar increases Prior Art Document 1: Korean Patent Laid-open Publication No. 2019-0058072 (published on May 29, 2019).

SUMMARY

Problems to be Solved by the Invention

In view of the foregoing, the present disclosure provides a radar with improved angular resolution in horizontal and vertical directions for long-distance and near-field detection by efficiently arranging multiple transmitter antennas and multiple receiver antennas. The problems to be solved by the present disclosure are not limited to the above-described problems. There may be other problems to be solved by the present disclosure.

Means for Solving the Problems

A first aspect of the present disclosure provides a radar including: a transmitter antenna unit that includes multiple transmitter antennas arranged at first horizontal distances and first vertical distances from each other; a receiver antenna unit that includes multiple receiver antennas arranged at second horizontal distances and second vertical distances from each other; a transceiver that transmits transmission signals through the transmitter antenna unit and receives return signals reflected from a target object trough the receiver antenna unit; and a processing unit that derives information about the target object by processing the received return signals.

A second aspect of the present disclosure provides an antenna built in a radar and including: a transmitter antenna unit that includes multiple transmitter antennas arranged at first horizontal distances and first vertical distances from each other; and a receiver antenna unit that includes multiple receiver antennas arranged at second horizontal distances and second vertical distances from each other.

The above-described aspects are provided by way of illustration only and should not be construed as liming the present disclosure. Besides the above-described embodiments, there may be additional embodiments described in the accompanying drawings and the detailed description.

Effects of the Invention

According to the present disclosure, it is possible to improve angular resolution in horizontal and vertical directions for long-distance and near-field detection by efficiently arranging multiple transmitter antennas and multiple receiver antennas.

Further, according to the present disclosure, the multiple transmitter antennas are arranged at horizontal distances and vertical distances to have a horizontal offset and a vertical offset, and, thus, it is possible to precisely detect information about an object in the horizontal and vertical directions.

DETAILED DESCRIPTION

Figure 1:
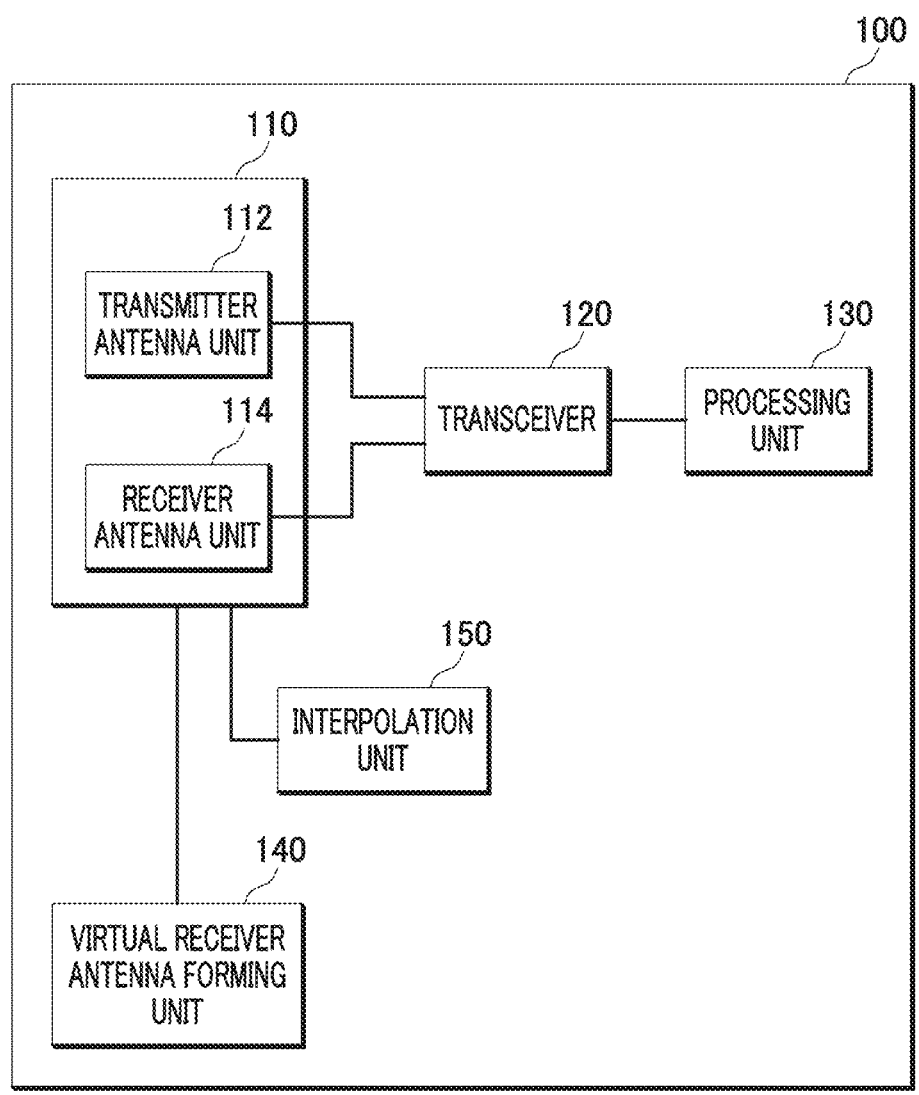
FIG. 1 is a block diagram of a radar in accordance with an embodiment of the present disclosure.

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "unit" includes a unit implemented by hardware or software and a unit implemented by both of them. One unit may be implemented by two or more pieces of hardware, and two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowcharts.

FIG. 1 is a block diagram of a radar 100 in accordance with an embodiment of the present disclosure. Referring to FIG. 1, the radar 100 may include an antenna 110, a transceiver 120, a processing unit 130, a virtual receiver antenna forming unit 140, and an interpolation unit 150.

Figure 2:
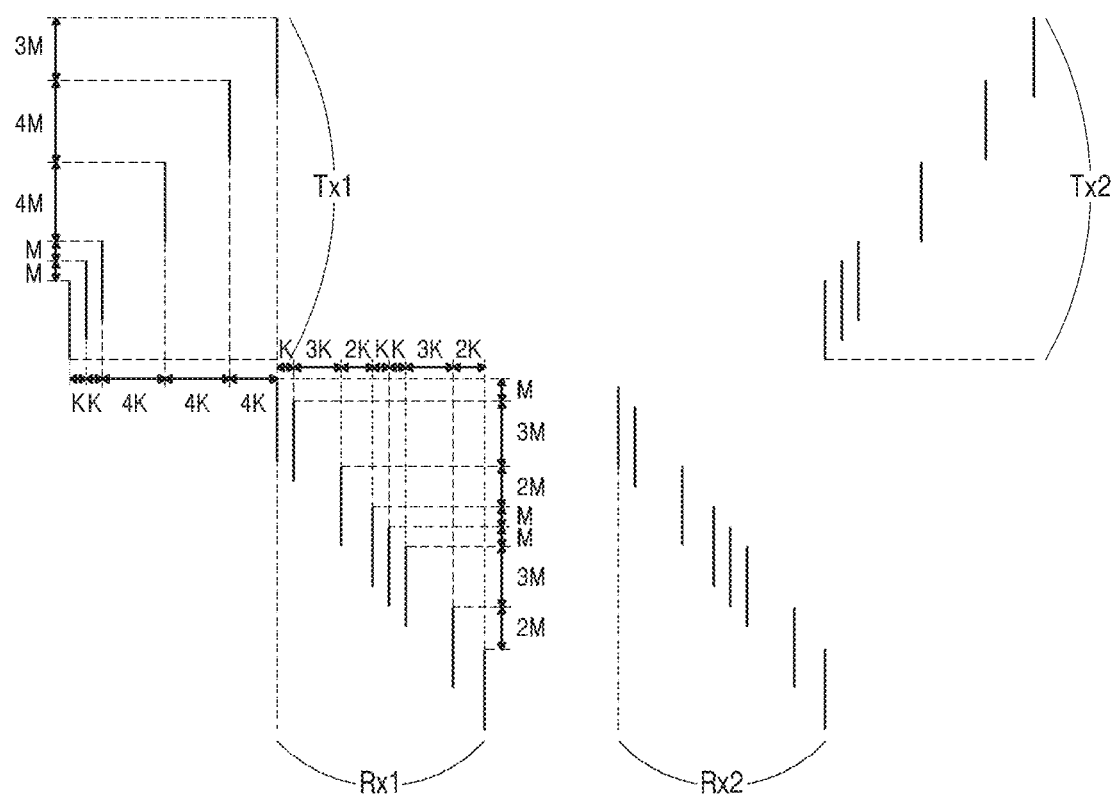
FIG. 2 illustrates an example of the array of multiple transmitter antennas and multiple receiver antennas of an antenna included in a radar in accordance with an embodiment of the present disclosure.

FIG. 2 illustrates an example of the array of multiple transmitter antennas and multiple receiver antennas of an antenna included in a radar in accordance with an embodiment of the present disclosure.

Hereafter, embodiments of the present disclosure will be described with reference to FIG. 1 and FIG. 2.

The radar 100 may be installed at a specific position of a vehicle and configured to transmit a transmission signal through the antenna 110, receive a reception signal reflected and returning from a target object around the vehicle, and detect the presence or absence, position, direction, or size of the target object. The target object detection result obtained by the radar 100 can be used to accurately control a vehicle system by applying it to the vehicle system that provides a collision avoidance function for avoiding a collision with a vehicle ahead, a safe lane change function, or the like.

The antenna 110 is comprised of a transmitter antenna unit 112 that includes multiple transmitter antennas arranged at first horizontal distances and first vertical distances from each other and a receiver antenna unit 114 that includes multiple receiver antennas arranged at second horizontal distances and second vertical distances from each other.

The transmitter antenna unit 112 may include multiple transmitter antennas that transmit transmission signals to detect a target object. More specifically, the transmitter antenna unit 112 may be comprised of a first transmitter antenna group Tx1 and a second transmitter antenna group Tx2 arranged in a diagonal direction at the first horizontal distances and the first vertical distances, which are one or more times than the first horizontal distances. In another embodiment, some of the multiple transmitter antennas may be arranged in a non-uniform linear array (NLA).

The multiple transmitter antennas may be spaced away from each other by the first horizontal distances and the first vertical distances in a horizontal direction and a vertical direction, respectively, and may have phase differences in the horizontal direction and the vertical direction. In this case, each of the multiple transmitter antennas can perform beamforming of transmission signals in the horizontal direction and the vertical direction by a phase shift. Herein, the beamforming of transmission signals in the horizontal direction can be performed by transmitting the transmission signals through the multiple transmitter antennas which are spaced away from each other by the first horizontal distances in the horizontal direction and have a phase difference in the horizontal direction. Also, the beamforming of transmission signals in the vertical direction can be performed by transmitting the transmission signals through the multiple transmitter antennas which are spaced away from each other by the first vertical distances in the vertical direction and have a phase difference in the vertical direction. Further, the multiple transmitter antennas included in the first transmitter antenna group Tx1 and the second transmitter antenna group Tx2 may be spaced away from each other by the first vertical distances, which are one or more times than the first horizontal distances, to have a vertical offset. In a desirable embodiment, the first vertical distances may be two or more times than the first horizontal distances.

Figure 5:
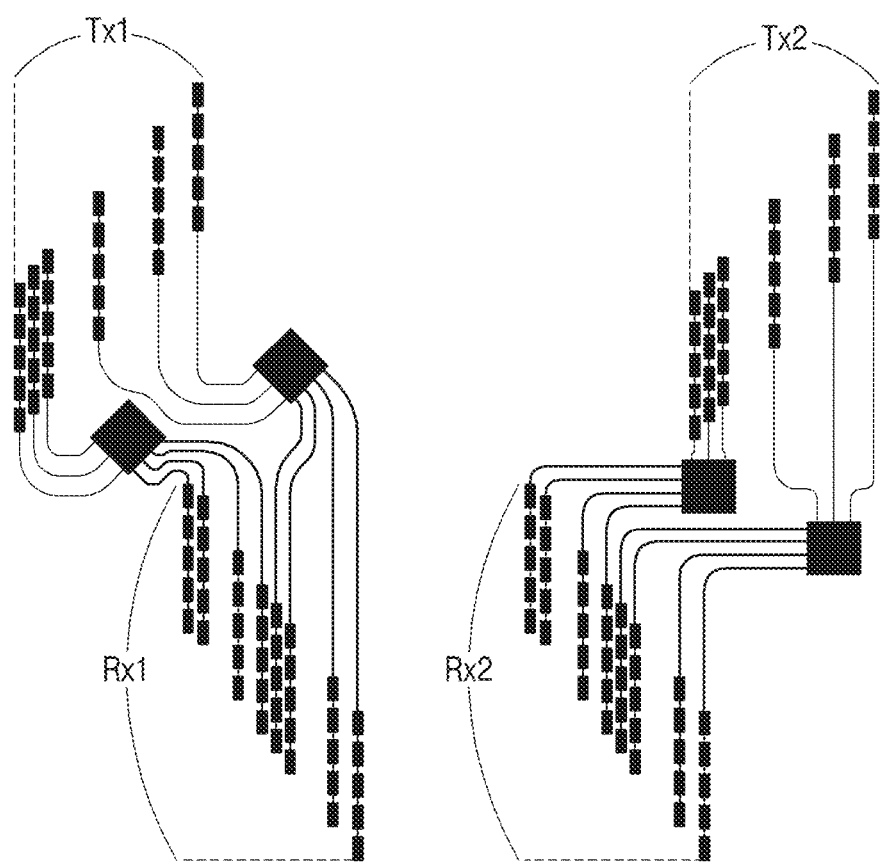
FIG. 5 illustrates an example of a chip in accordance with an embodiment of the present disclosure.

FIG. 5 illustrates an example of a chip in accordance with an embodiment of the present disclosure.

For example, referring to FIG. 5, the multiple transmitter antennas included in each of the first transmitter antenna group Tx1 and the second transmitter antenna group Tx2 and connected to multiple chips may compensate for a phase difference caused by the first horizontal distances in the horizontal direction and a phase difference caused by the first vertical distances in the vertical direction by a phase shift and then perform beamforming of transmission signals in the horizontal direction and the vertical direction. In this case, if a binary phase shift is simultaneously applied to the first transmitter antenna group Tx1 and the second transmitter antenna group Tx2, multi-input multi-output (MIMO) can be implemented simultaneously. In CDMA-mode MIMO processing, two or more transmitter antennas may operate simultaneously, and in TDMA-mode MIMO processing, the transmitter antennas may operate at individual timings.

Both the CDMA mode and the TDMA mode can be applied to the present disclosure, and the MIMO processing may be performed by applying the CDMA mode to some of the transmitter antennas and the TDMA mode to the other transmitter antennas.

For example, when the multiple transmitter antennas transmit transmission signals and the multiple receiver antennas receive return signals reflected from a target object, it is possible to distinguish which transmitter antenna has transmitted a transmission signal corresponding to a return signal which has been received through CDMA- or TDMA-mode MIMO processing.

In the embodiment illustrated in FIG. 5, an antenna structure including transmitter antennas and receiver antennas is constructed using four chips. For example, an antenna structure may be constructed by cascading multiple chips to enable receiver antennas in the respective chips to receive simultaneously return signals reflected from a target object.

The multiple transmitter antennas included in each of the first transmitter antenna group Tx1 and the second transmitter antenna group Tx2 may be arranged in the diagonal direction at first horizontal distances and first vertical distances (are one or more times than the first horizontal distances) according to the ratio of 1:1:4:4:3. Herein, if a reference distance for the first horizontal distances is K, the first horizontal distances may include at least K, 3K and 4K, and if a reference distance for the first vertical distances is M, the first vertical distances may include at least M, 3M and 4M. In a desirable embodiment, M may be equal to 2K. For example, if the reference distance for the first horizontal distances is 0.5 lambda and the reference distance for the first vertical distances is 1.0 lambda, M number of transmitter antennas among the multiple transmitter antennas included in each of the first transmitter antenna group Tx1 and the second transmitter antenna group Tx2 may be arranged at a first horizontal distance of 0.5 lambda and a first vertical distance of 1 lambda from each other, N number of transmitter antennas may be arranged at a first horizontal distance of 2 lambda and a first vertical distance of 4 lambda from each other, and the other one transmitter antenna may be arranged at a first horizontal distance of 1.5 lambda and a first vertical distance of 3 lambda.

The multiple transmitter antennas included in the first transmitter antenna group Tx1 and the second transmitter antenna group Tx2 may have a transmitter antenna beam area from which transmission signals are transmitted in different vertical and horizontal directions.

Referring to FIG. 1 and FIG. 2 again, the receiver antenna unit 114 may include multiple receiver antennas that receive signals which have been transmitted from the transmitter antenna unit 112 and then reflected and returned from the target object. More specifically, the receiver antenna unit 114 may include a first receiver antenna group Rx1 and a second receiver antenna group Rx2 arranged at the second horizontal distances and the second vertical distances, which are one or more times than the second horizontal distances. In a desirable embodiment, the second vertical distances may be two or more times than the second horizontal distances. In another embodiment, some of the multiple receiver antennas may be arranged in a non-uniform linear array (NULA).

The multiple receiver antennas included in each of the first receiver antenna group Rx1 and the second receiver antenna group Rx2 may be arranged repeatedly in a diagonal direction at second horizontal distances and second vertical distances (one or more times than the second horizontal distances) according to the ratio of 1:3:2. Herein, if a reference distance for the second horizontal distances is K, the second horizontal distances may include at least K, 2K and 3K, and if a reference distance for the second vertical distances is M, the second vertical distances may include at least M, 2M and 3M. In a desirable embodiment, M may be equal to 2K. For example, if the reference distance for the second horizontal distances is 0.5 lambda and the reference distance for the second vertical distances is 1.0 lambda, first receiver antennas included in each of the first receiver antenna group Rx1 and the second receiver antenna group Rx2 may be arranged at a second horizontal distance of 0.5 lambda and a second vertical distance of 1.0 lambda from each other, second receiver antennas may be arranged at a second horizontal distance of 1.5 lambda and a second vertical distance of 3.0 lambda from each other, third receiver antennas may be arranged at a second horizontal distance of 1.0 lambda and a second vertical distance of 2.0 lambda from each other, fourth receiver antennas may be arranged at a second horizontal distance of 0.5 lambda and a second vertical distance of 1.0 lambda from each other, fifth receiver antennas may be arranged at a second horizontal distance of 1.5 lambda and a second vertical distance of 3.0 lambda from each other, sixth receiver antennas may be arranged at a second horizontal distance of 1.0 lambda and a second vertical distance of 2.0 lambda from each other.

In the present disclosure, the array of antennas is formed as described above (the transmitter antennas are arranged according to the distance ratio of 1:1:4:4:3 and the receiver antennas are arranged repeatedly according to the distance ratio of 1:3:2). Thus, no space is left empty when array interpolation is performed and a grating lobe, which has a bad effect on the performance of antennas, can be formed far from a main beam or a main lobe. Accordingly, the horizontal detection resolution or horizontal resolution can be improved. Further, in the present disclosure, a plane array of virtual receiver antennas can be formed through MIMO processing, and, thus, a stable sidelobe level and an excellent angular resolution can be provided to the (horizontal/vertical) plane perpendicular to a radial direction.

In the present disclosure, the antennas are arranged to have three or more horizontal positions and vertical positions in the horizontal direction and the vertical direction, respectively. Thus, it is possible to distinguish two or more target objects which are identical to each other in distance and speed and different from each other in azimuth angle and elevation angle.

Figure 6:
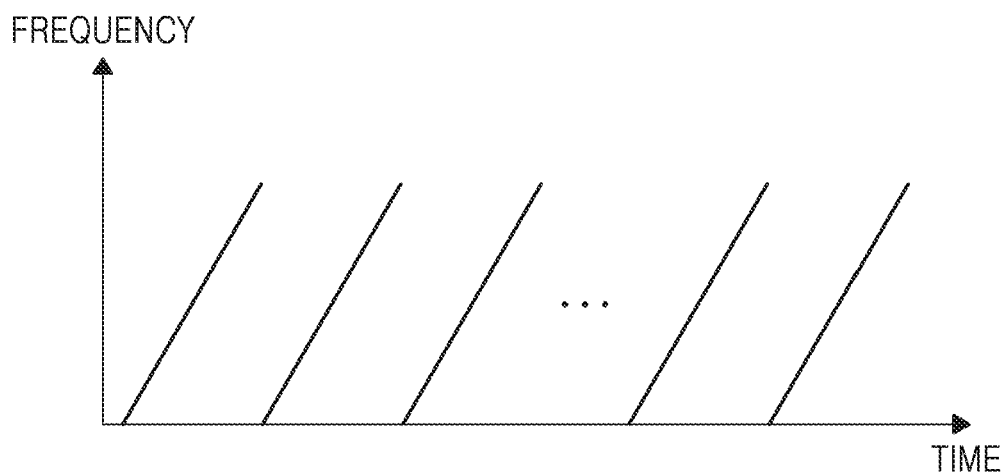
FIG. 6 illustrates a signal waveform of a radar in accordance with an embodiment of the present disclosure.

The transceiver 120 may transmit transmission signals through the transmitter antenna unit 112 and receive return signals reflected from the target object trough the receiver antenna unit 114. For example, the transceiver 120 may quickly transmit transmission signals at a predetermined interval through the transmitter antenna unit 112 by a first transmission method (e.g., fast-chirp FMCW) as shown in FIG. 6 and may receive return signals reflected from the target object through the receiver antenna unit 114.

The processing unit 130 may derive information about the target object by processing the received return signals. For example, the processing unit 130 may acquire vertical information, such as the height of the target object, and horizontal information, such as the width of the target object, from the received return signals.

When MIMO processing is performed through the multiple transmitter antennas arranged at the first horizontal distances and the first vertical distances from each other, the virtual receiver antenna forming unit 140 may form multiple virtual receiver antennas arranged in a diagonal direction at the second horizontal distances and the second vertical distances so as to be in parallel with the multiple transmitter antennas, respectively.

FIG. 3A to FIG. 3D illustrate an example of detecting horizontal information using the array of antennas accordance with an embodiment of the present disclosure.

Figure 3A:
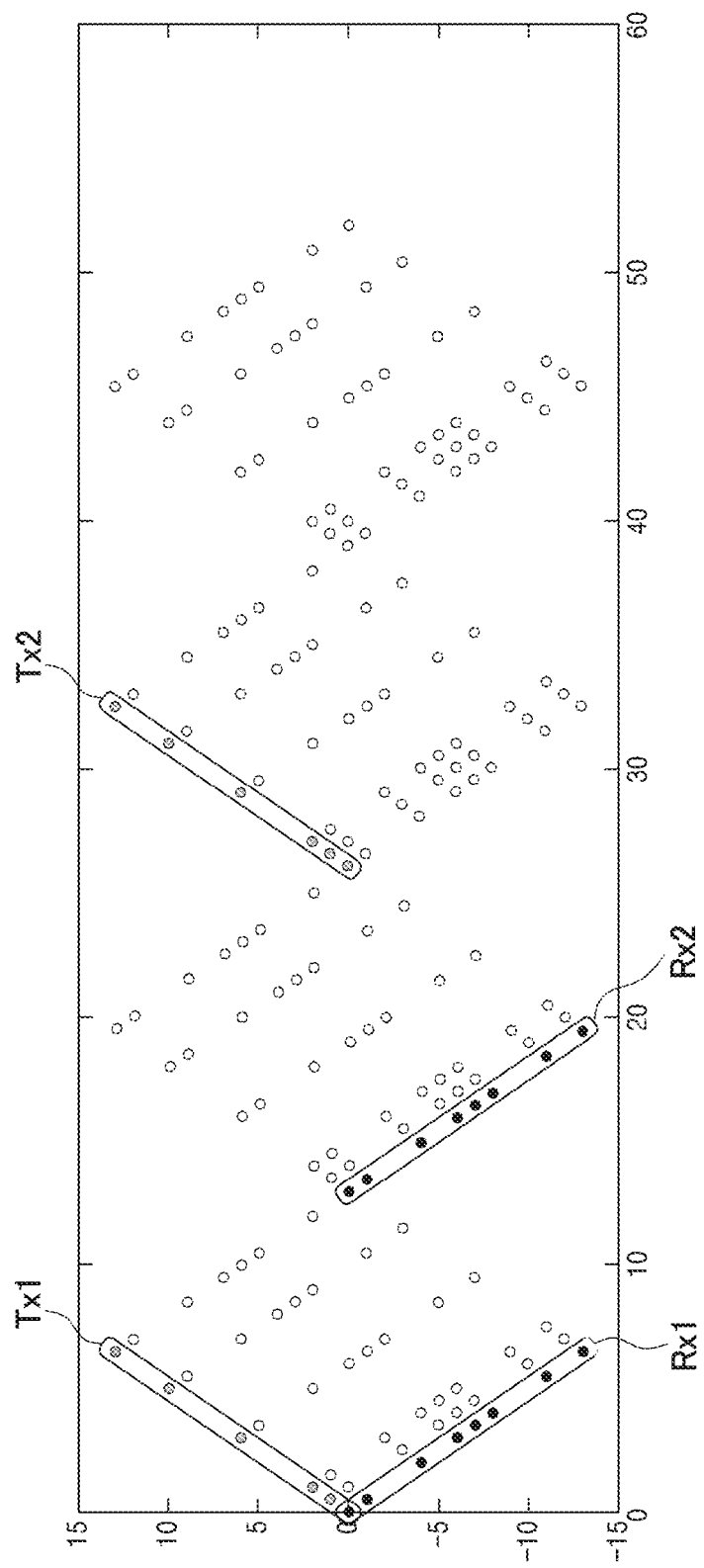
FIG. 3A illustrates an example of detecting horizontal information using the array of antennas accordance with an embodiment of the present disclosure.

In FIG. 3A, red dots represent transmitter antennas and blue dots represent receiver antennas. Also, circles represent antenna arrays interpolated by MIMO processing.

Figure 3B:
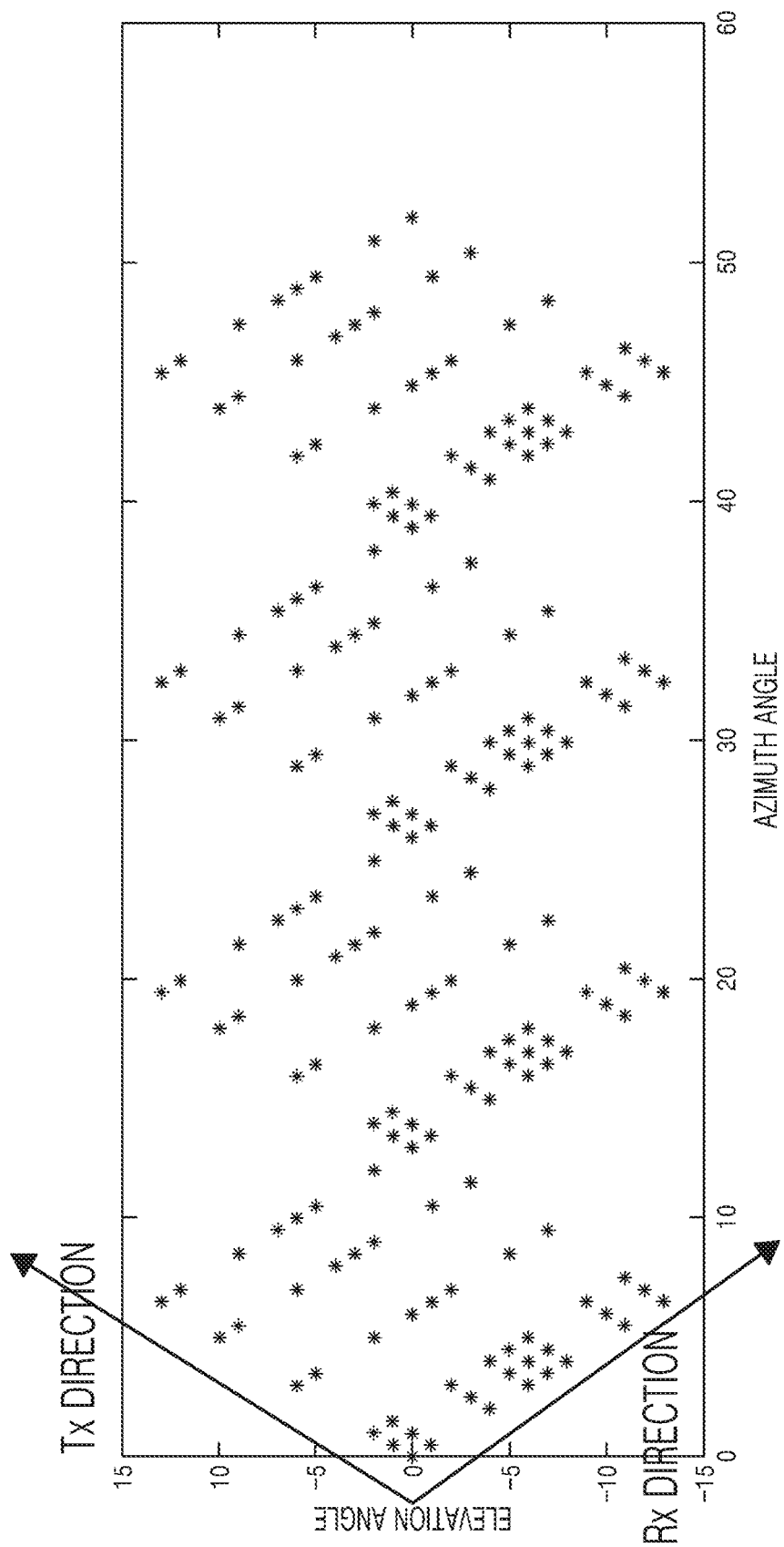
FIG. 3B illustrates an example of detecting horizontal information using the array of antennas accordance with an embodiment of the present disclosure.

For example, referring to FIG. 2, FIG. 3A and FIG. 3B together, when the multiple transmitter antennas included in each of the first transmitter antenna group Tx1 and the second transmitter antenna group Tx2 transmit identical transmission signals at the same time, receiver antennas configured to receive reception signals reflected and returning from the target object based on the transmission signals can have the same effect as if they were spatially shifted by the second horizontal distances and the second vertical distances in the horizontal and vertical directions and received the identical reception signals. Multiple virtual receiver antennas can be formed at the shifted positions. Accordingly, the multiple virtual receiver antennas are formed at a receiver end based on the first receiver antenna group Rx1 and the second receiver antenna group Rx2 including the multiple receiver antennas. Thus, an extended aperture can be secured. Therefore, it is possible to precisely measure horizontal and vertical information about the target object in a long distance and also possible to improve the resolution of the horizontal and vertical information. For example, a azimuth angular resolution can be improved to 1.1 deg and the elevation angular resolution can be improved to 2.2 deg.

The present disclosure can provide a virtual antenna structure to make a position where a grating lobe occurs far from the center where the main beam is located, i.e., to suppress the occurrence of a grating lobe.

Figure 3C:
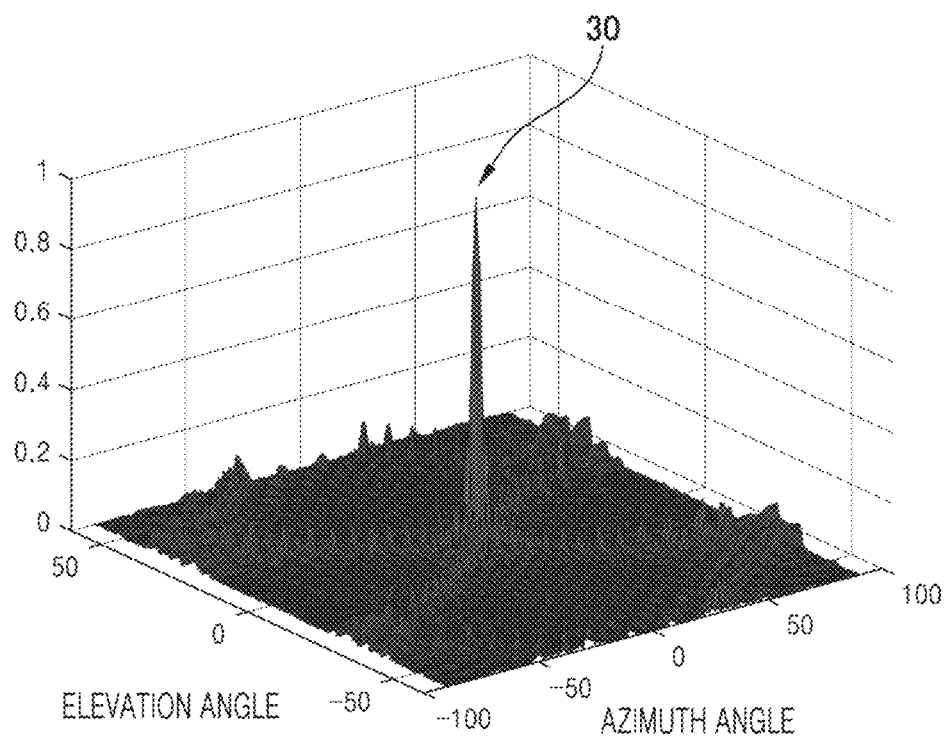
FIG. 3C illustrates an example of detecting horizontal information using the array of antennas accordance with an embodiment of the present disclosure.
Figure 3D:
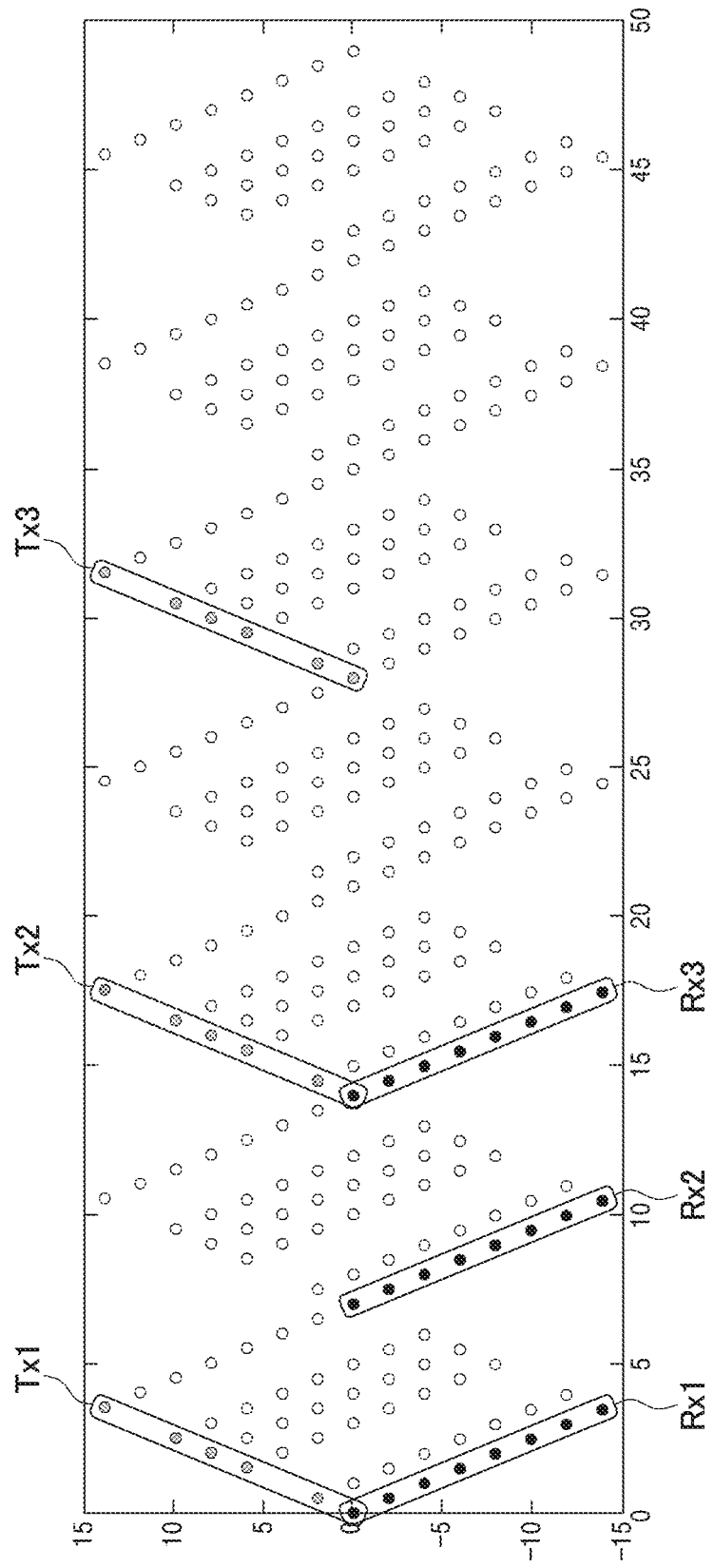
FIG. 3D illustrates an example of detecting horizontal information using the array of antennas accordance with an embodiment of the present disclosure.

FIG. 3D illustrates antennas arranged in a 4D radar using six transceiver chips (RFIC). Referring to FIG. 3D, the array of antennas in each of the transceiver chips of the 4D radar may be extended. Each of the six transceiver chips may have a base unit including six transmitter antennas having an NLA structure and eight receiver antennas having a uniform linear array (ULA) structure. The six transmitter antennas extended from each transceiver chip may be arranged on a substrate in the vertical and horizontal directions according to the ratio of 1:1:4:4:3 (i.e., 0.5:0.5:2:2:1.5 lambda).

The eight receiver antennas extended from each transceiver chip have the ULA structure and thus do not have a grating lobe with a low sidelobe level. Therefore, the safety can be improved.

The six transmitter antennas can be grouped into three groups and configured in MIMO mode. Herein, red dots represent transmitter antennas and blue dots represent receiver antennas. Also, circles represent antenna arrays interpolated by MIMO processing.

Accordingly, in the present disclosure, it is possible to improve the measurement resolution for the horizontal and vertical information about the target object. For example, the azimuth angular resolution can be improved to 1.1 deg and the elevation angular resolution can be improved to 2.2 deg.

Referring to FIG. 1 and FIG. 2 again, when MIMO processing is performed through the multiple transmitter antennas arranged at the first horizontal distances and the first vertical distances, the virtual receiver antenna forming unit 140 may form multiple virtual receiver antenna groups arranged in the same vertical and horizontal directions as the first receiver antenna group Rx1 and the second receiver antenna group Rx2.

In this case, multiple virtual receiver antennas included in the multiple virtual receiver antenna groups formed in the same vertical and horizontal directions as the first receiver antenna group Rx1 and the second receiver antenna group Rx2 may have a horizontal offset at the second horizontal distances and a vertical offset at the second vertical distances. Accordingly, in the present disclosure, it is possible to estimate an angle of the target object using a phase difference between the virtual receiver antenna groups formed in the same vertical and horizontal direction as the first receiver antenna group Rx1 and the second receiver antenna group Rx2 and having the horizontal offset and the vertical offset.

When MIMO processing is performed through the multiple transmitter antennas, the virtual receiver antenna forming unit 140 may form multiple virtual receiver antennas corresponding to multiple transmitter antennas, respectively, so that the center points of the multiple virtual receiver antennas form a two-dimensional plane.

The virtual receiver antenna forming unit 140 may form multiple virtual receiver antennas having a horizontal offset at the second horizontal distances and a vertical offset at the second vertical distances in an antenna pattern formed into a triangle in Latex at the second horizontal distances and the second vertical distances by applying NLA interpolation to the multiple receiver antennas.

Figure 4:
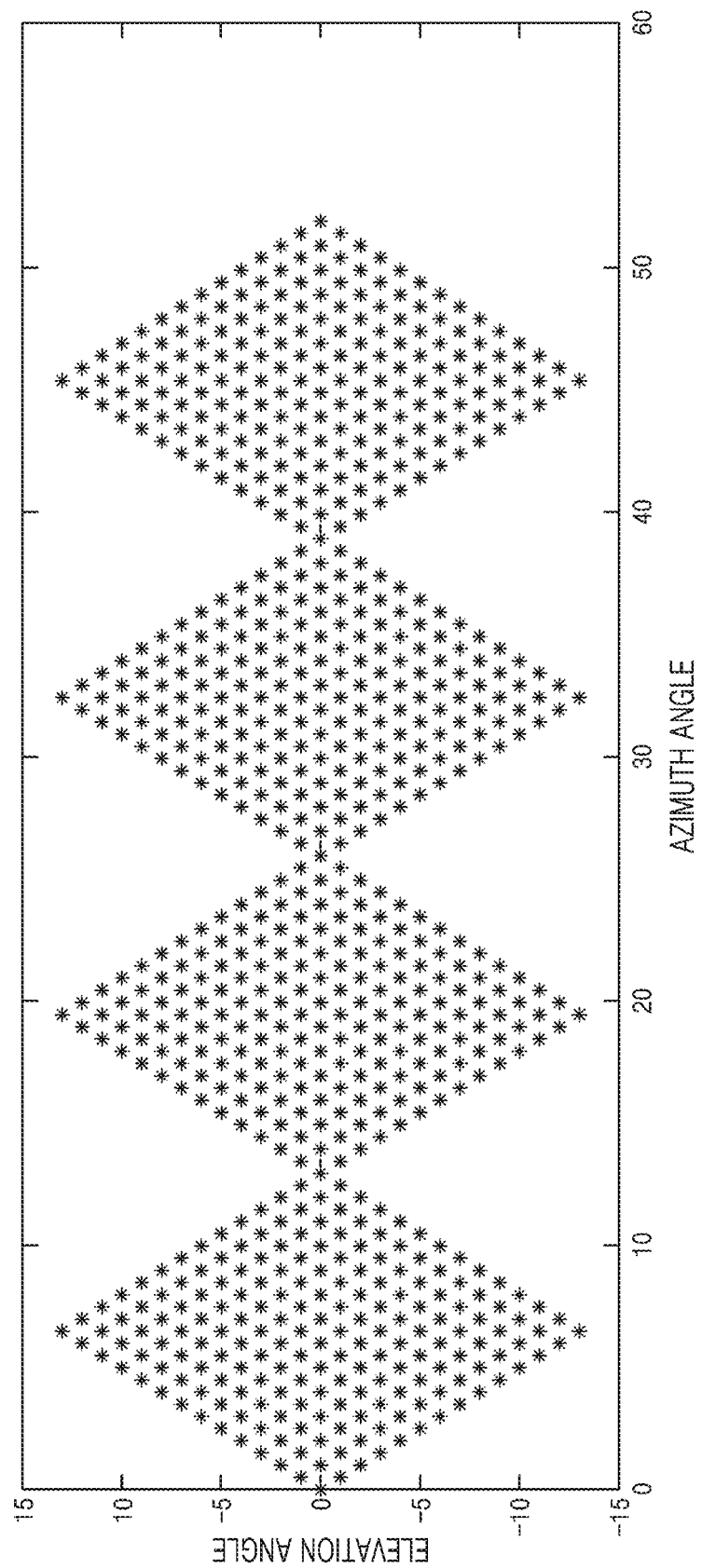
FIG. 4 illustrates an antenna pattern formed by applying non-linear array interpolation in accordance with an embodiment of the present disclosure.

The interpolation unit 150 may form an antenna pattern (see FIG. 4) arranged in the form of a triangle in Latex within a horizontal area and a vertical area corresponding to the multiple receiver antennas and the multiple virtual receiver antennas by applying the NULA interpolation to the multiple receiver antennas and the multiple virtual receiver antennas. When the NULA interpolation is applied to the multiple receiver antennas, the maximum radiation aperture can be obtained with a limited number of receiver channels.

A two-dimensional synthetic beam pattern of the multiple virtual receiver antennas formed by the virtual receiver antenna forming unit 140 can be expressed as shown in FIG. 3C.

Referring to FIG. 3C, the processing unit 130 may generate an angular power spectrum using a steering vector generated for each channel according to an arrangement of multiple transmitter antennas and multiple receiver antennas. The steering vector can be generated as in Equation 1.

$$w_n = e^{j\frac{2\pi}{\lambda} \sin \theta_d (\cos\phi_d x_n + \sin \phi_d y_n)}$$ [Equation 1]

Herein, $x_n$ and $y_n$ are two-dimensional antenna positions, $\theta$ is an azimuth angle and $\phi$ is an elevation angle.

The processing unit 130 can detect an azimuth angle and an elevation angle of the target object based on a peak point 30 of the generated angular power spectrum.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Radar
110: Antenna
112: Transmitter antenna unit
114: Receiver antenna unit
120: Transceiver
130: Processing unit
140: Virtual receiver antenna forming unit
150: Interpolation unit

What is claimed is:
1. A radar, comprising:
a transmitter antenna unit that includes multiple transmitter antennas arranged at first horizontal distances and first vertical distances from each other;

a receiver antenna unit that includes multiple receiver antennas arranged at second horizontal distances and second vertical distances from each other;

a transceiver that transmits transmission signals through the transmitter antenna unit and receives return signals reflected from a target object trough the receiver antenna unit; and a processing unit that derives information about the target object by processing the received return signals, wherein each of the multiple transmitter antennas is spaced away from an adjacent transmitter antenna by one of the first horizontal distances in a same horizontal direction and is spaced away from the adjacent transmitter antenna by one of the first vertical distances in a first vertical direction; and wherein each of the multiple receiver antennas is spaced away from an adjacent receiver antenna by one of the second horizontal distances in the horizontal direction and is spaced away from the adjacent receiver antenna by one of the second vertical distances in a second vertical direction opposite to the first vertical direction.

2. The radar of claim 1, wherein the first vertical distances are one or more times than the first horizontal distances, and the second vertical distances are one or more times than the second horizontal distances.

3. The radar of claim 2, further comprising:

a virtual receiver antenna forming unit that forms multiple virtual receiver antennas arranged at the second horizontal distances and the second vertical distances and corresponding to the multiple transmitter antennas, respectively, when multi-input multi-output processing (MIMO) is performed through the multiple transmitter antennas arranged at the first horizontal distances and the first vertical distances.

4. The radar of claim 3, wherein if a reference distance for the first horizontal distances is K, the first horizontal distances include at least K, 3K and 4K, and if a reference distance for the first vertical distances is M, the first vertical distances include at least M, 3M and 4M.

5. The radar of claim 4, wherein if a reference distance for the second horizontal distances is K, the second horizontal distances include at least K, 2K and 3K, and if a reference distance for the second vertical distances is M, the second vertical distances include at least 1M, 2M and 3M.

6. The radar of claim 5, further comprising:

an interpolation unit that forms an antenna pattern arranged in a form of a triangle in Latex within a horizontal area and a vertical area corresponding to the multiple receiver antennas and the multiple virtual receiver antennas by applying non-uniform linear array (NLA) interpolation to the multiple receiver antennas and the multiple virtual receiver antennas.

7. The radar of claim 6, wherein the processing unit generates an angular power spectrum using a steering vector generated for each channel according to an arrangement of the multiple transmitter antennas and the multiple receiver antennas, and the processing unit detects an azimuth angle and an elevation angle of the target object based on a peak point of the generated angular power spectrum.

8. An antenna built in a radar, comprising:

a transmitter antenna unit that includes multiple transmitter antennas arranged at first horizontal distances and first vertical distances from each other; and a receiver antenna unit that includes multiple receiver antennas arranged at second horizontal distances and second vertical distances from each other, wherein each of the multiple transmitter antennas is spaced away from an adjacent transmitter antenna by one of the first horizontal distances in a same horizontal direction and is spaced away from an adjacent transmitter antenna by one of the first vertical distances in a first vertical direction; and wherein each of the multiple receiver antennas is spaced away from an adjacent receiver antenna by one of the second horizontal distances in the horizontal direction and is spaced away from the adjacent receiver antenna by one of the second vertical distances in a second vertical direction opposite to the first vertical direction.

9. The radar of claim 1, wherein a first set of the multiple transmitter antennas and a first set of the multiple receiver antennas are connected to a first chip and; and wherein a second set of the multiple transmitter antennas and a second set of the multiple receiver antennas are connected to a second chip.

10. The antenna of claim 8, wherein a first set of the multiple transmitter antennas and a first set of the multiple receiver antennas are connected to a first chip and; and wherein a second set of the multiple transmitter antennas and a second set of the multiple receiver antennas are connected to a second chip.

11. The radar of claim 1, wherein each of the multiple transmitter antennas is an array of antenna elements and each of the multiple receiver antennas is an array of antenna elements.

12. The antenna of claim 8, wherein each of the multiple transmitter antennas is an array of antenna elements and each of the multiple receiver antennas is an array of antenna elements.

* * * * *